US008839065B2

(12) United States Patent
Rajapakse

(10) Patent No.: US 8,839,065 B2
(45) Date of Patent: Sep. 16, 2014

(54) PACKET LOSS ANTICIPATION AND PRE EMPTIVE RETRANSMISSION FOR LOW LATENCY MEDIA APPLICATIONS

(75) Inventor: Ravi U. Rajapakse, San Francisco, CA (US)

(73) Assignee: Blackfire Research Corporation, San Francisco, CA (US)

(*) Notice: Subject to any disclaimer, the term of this patent is extended or adjusted under 35 U.S.C. 154(b) by 228 days.

(21) Appl. No.: 13/561,029

(22) Filed: Jul. 28, 2012

(65) Prior Publication Data
US 2013/0028121 A1    Jan. 31, 2013

Related U.S. Application Data

(60) Provisional application No. 61/512,924, filed on Jul. 29, 2011.

(51) Int. Cl.
G06F 11/00 (2006.01)
G08C 25/02 (2006.01)
H04L 29/06 (2006.01)

(52) U.S. Cl.
CPC .......... *H04L 65/4076* (2013.01); *H04L 69/163* (2013.01); *H04L 69/166* (2013.01); *H04L 65/608* (2013.01); *H04L 65/80* (2013.01)
USPC ............................................. 714/748; 714/48

(58) Field of Classification Search
USPC ............ 370/231–236, 329, 468–469; 714/18, 714/746–750
See application file for complete search history.

(56) References Cited

U.S. PATENT DOCUMENTS

| | | | |
|---|---|---|---|
| 6,907,460 B2 * | 6/2005 | Loguinov et al. | 709/224 |
| 7,035,214 B1 * | 4/2006 | Seddigh et al. | 370/231 |
| 7,298,701 B2 * | 11/2007 | Hsu et al. | 370/235 |
| 7,607,062 B2 * | 10/2009 | Grove et al. | 714/748 |
| 7,848,287 B2 * | 12/2010 | Diachina et al. | 370/329 |
| 2001/0007137 A1 * | 7/2001 | Suumaki et al. | 714/18 |
| 2005/0180327 A1 * | 8/2005 | Banerjee et al. | 370/236 |
| 2008/0037420 A1 * | 2/2008 | Tang | 370/229 |
| 2009/0019505 A1 * | 1/2009 | Gopalakrishnan et al. | 725/109 |
| 2009/0279482 A1 * | 11/2009 | Tinnakornsrisuphap et al. | 370/328 |
| 2011/0035641 A1 * | 2/2011 | Markowitz et al. | 714/748 |
| 2014/0050095 A1 * | 2/2014 | Szilagyi et al. | 370/236 |

* cited by examiner

*Primary Examiner* — Thai Hoang
(74) *Attorney, Agent, or Firm* — Galvin Patent Law LLC; Brian R. Galvin

(57) ABSTRACT

In many low latency media applications it is important to transmit media data packets from a media source to one or more media destinations as promptly as possible, while also ensuring that all media data packets that may be lost due to transmission errors are retransmitted and received correctly at the media destination. This invention described a system to do this with a system and methods for anticipating media data packet loss and making preemptive media data packet retransmission requests by dynamically computing a metric and decision logic for retransmission request that includes a need based factor from the media consuming application.

12 Claims, 13 Drawing Sheets

Metric Mx

| | | NEED % (N) | | | | | | | | | | |
|---|---|---|---|---|---|---|---|---|---|---|---|---|
| | | 0 | 10 | 20 | 30 | 40 | 50 | 60 | 70 | 80 | 90 | 100 |
| DELAY % (Dx) | 0 | 0 | 0 | 0 | 1 | 2 | 5 | 11 | 27 | 64 | 100 | 100 |
| | 5 | 0 | 0 | 1 | 1 | 3 | 7 | 17 | 41 | 99 | 100 | 100 |
| | 10 | 0 | 0 | 1 | 2 | 5 | 11 | 27 | 64 | 100 | 100 | 100 |
| | 15 | 0 | 1 | 1 | 3 | 7 | 17 | 41 | 99 | 100 | 100 | 100 |
| | 20 | 0 | 1 | 2 | 5 | 11 | 27 | 64 | 100 | 100 | 100 | 100 |
| | 25 | 1 | 1 | 3 | 7 | 17 | 41 | 99 | 100 | 100 | 100 | 100 |
| | 30 | 1 | 2 | 5 | 11 | 27 | 64 | 100 | 100 | 100 | 100 | 100 |
| | 35 | 1 | 3 | 7 | 17 | 41 | 99 | 100 | 100 | 100 | 100 | 100 |
| | 40 | 2 | 5 | 11 | 27 | 64 | 100 | 100 | 100 | 100 | 100 | 100 |
| | 45 | 3 | 7 | 17 | 41 | 99 | 100 | 100 | 100 | 100 | 100 | 100 |
| | 50 | 5 | 11 | 27 | 64 | 100 | 100 | 100 | 100 | 100 | 100 | 100 |
| | 55 | 7 | 17 | 41 | 99 | 100 | 100 | 100 | 100 | 100 | 100 | 100 |
| | 60 | 11 | 27 | 64 | 100 | 100 | 100 | 100 | 100 | 100 | 100 | 100 |
| | 65 | 17 | 41 | 99 | 100 | 100 | 100 | 100 | 100 | 100 | 100 | 100 |
| | 70 | 27 | 64 | 100 | 100 | 100 | 100 | 100 | 100 | 100 | 100 | 100 |
| | 75 | 41 | 99 | 100 | 100 | 100 | 100 | 100 | 100 | 100 | 100 | 100 |
| | 80 | 64 | 100 | 100 | 100 | 100 | 100 | 100 | 100 | 100 | 100 | 100 |
| | 85 | 99 | 100 | 100 | 100 | 100 | 100 | 100 | 100 | 100 | 100 | 100 |
| | 90 | 100 | 100 | 100 | 100 | 100 | 100 | 100 | 100 | 100 | 100 | 100 |
| | 95 | 100 | 100 | 100 | 100 | 100 | 100 | 100 | 100 | 100 | 100 | 100 |
| | 100 | 100 | 100 | 100 | 100 | 100 | 100 | 100 | 100 | 100 | 100 | 100 |

PACKET LOSS ANTICIPATION AND PRE EMPTIVE RETRANSMISSION FOR LOW LATENCY MEDIA APPLICATIONS

CROSS REFERENCE TO RELATED APPLICATIONS

This application claims priority under 35 U.S.C. §119(e) to U.S. Provisional Patent Application Ser. No. 61/512,924, filed Jul. 29, 2011, entitled "Techniques for broadcasting media over a local network to multiple destinations" the entire content of which is incorporated herein by reference.

BACKGROUND OF THE INVENTION

1. Field of the Invention

The present invention is directed to network communications and to digital media sourcing, transmission and rendering.

2. Summary of the Invention

The present invention is directed to low latency media applications where it is important to transmit media data packets from a media source to one or more media destinations as promptly as possible, while also ensuring that all media data packets that may be lost due to transmission errors are retransmitted and received correctly at the media destination. This invention includes a system and methods for anticipating media data packet loss and making preemptive media data packet retransmission requests of the media source.

BRIEF DESCRIPTION OF THE DRAWINGS

FIG. 12 shows these calculations computing the metrics $M_x$.

DETAILED DESCRIPTION OF THE INVENTION

Figure 1:
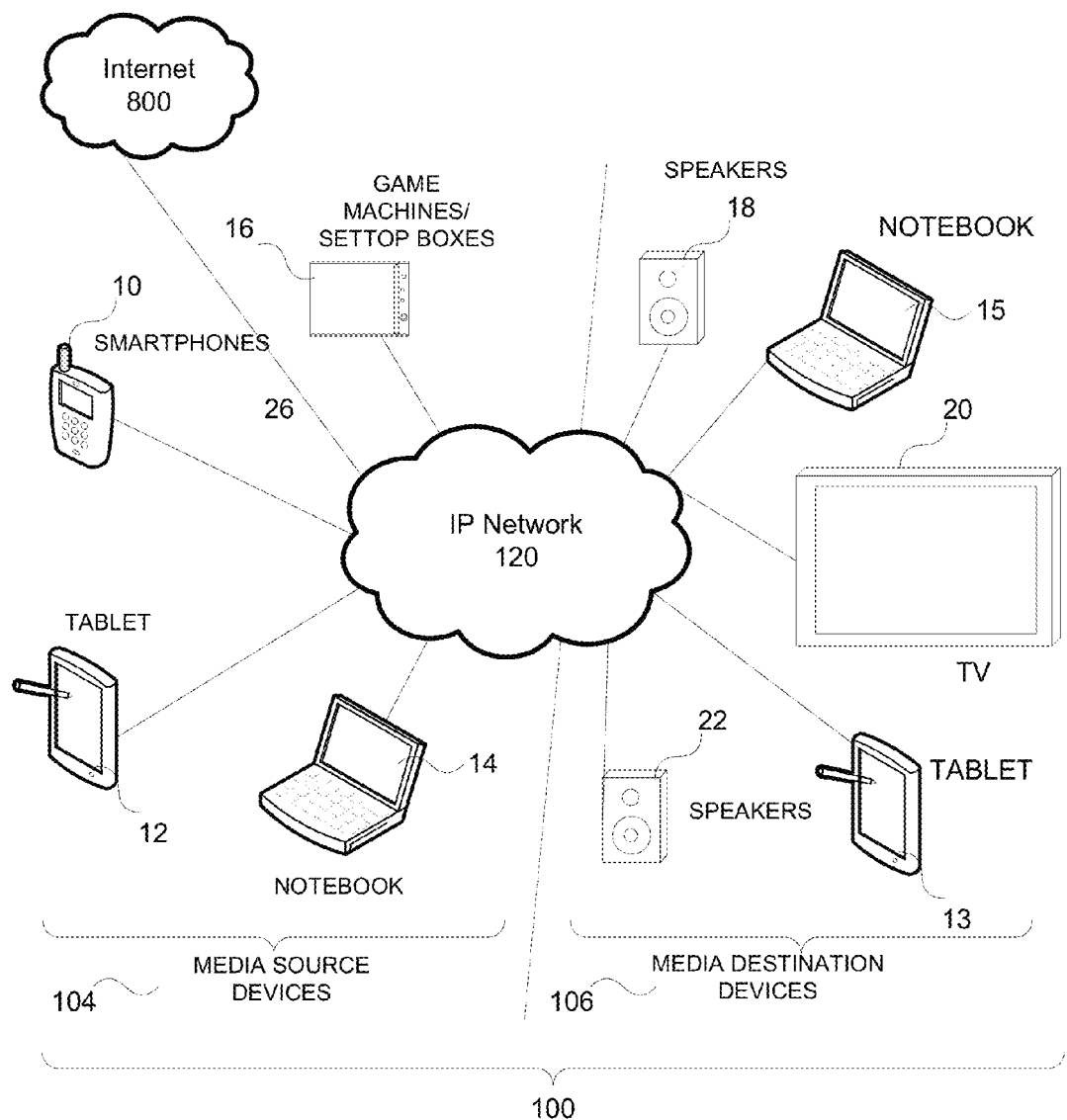
FIG. 1 illustrates an overview of the devices in a system in accordance with one embodiment.

Today there are many forms of digital media, many types of digital media sources, many types of digital media playback (rendering) systems and lots of ways of connecting media sources to media playback systems.

Digital media, hereafter referred to as media, comes in many forms, formats and containers, including Digital Video Disks, media files and media streams. The media contents can be audio, video, images or meta data media components and various combinations of each. For example a popular audio format is known as MP3 and a popular video format is H264. MP3 is an audio-specific media format that was designed by the Moving Picture Experts Group (MPEG) as part of its MPEG-1 standard and later extended in the MPEG-2 standard. H264 is a standard developed by the International Organization for Standardization (ISO)/International Electrotechnical Commission (IEC) joint working group, the Moving Picture Experts Group (MPEG). Movies are typically multimedia formats with a video and multiple audio channels in it. For example a 5.1 movie contains 1 video channel (media component) and 6 audio channels (audio components). 5.1 is the common name for six channel surround sound multichannel audio systems.

Digital media sources include media devices such as Digital Video Disk players, Blu-ray players, computer and mobile devices, and internet based "cloud" media services. Blu-ray Disc (BD) is an optical disc storage medium developed by the Blu-ray Disc Association. Internet based media services include services such as Netflix and Spotify™. Netflix is a media service and trademark of Netflix Inc. Spotify is a media service and trademark of Spotify Ltd. Digital media playback (media rendering destinations) systems include computer based devices, laptops and smartphones, as well as network audio and video devices. A SmartTV is an example of a digital media rendering device that can play media from an internet (cloud) based media service such as Netflix™. A SmartTV, which is also sometimes referred to as "Connected TV" or "Hybrid TV", is used to describe the integration of the internet and Web features into modern television sets and set-top boxes, as well as the technological convergence between computers and these television sets/set-top boxes. An internet radio device is another example of a digital media rendering device.

The connectivity between these media sources and devices is varied, but is evolving over time towards network based connectivity using IP protocols. This is because IP connectivity is convenient, ubiquitous and cheap. IP stands for Internet Protocol. An IP networked device is a device that adheres to the Internet Protocol suite standard. The Internet Protocol suite is defined by the Internet Engineering Task Force [IETF] standards body. The Internet is a global system of interconnected computer networks that use the standard Internet Protocol (IP) suite.

IP networks come in many forms; the most prevalent being Ethernet based wired IP networking. Ethernet is a family of computer networking technologies for local area networks (LANs) that is standardized as IEEE (Institute of Electrical and Electronics Engineers) Standard 802.3. In recent years with the prevalence of mobile computing devices, Wi-Fi has become the most popular means for connecting network devices wirelessly. Wi-Fi is a trademark of the Wi-Fi Alliance and a brand name for products using the IEEE 802.11 family of standards. A Wi-Fi network is a type of IP network.

The convenience and benefits of IP networking means that all of these media sources and playback systems, if not already network enabled, are becoming network enabled. Many Blu-ray players now have Ethernet and Wi-Fi network connectivity. Today most higher end TVs are smart TVs that have network capability. Similarly audio play back devices and even radios are network and internet enabled.

Mobile devices, such as mobile phones, tablets, readers, notebooks etc, are able to receive and store media and have powerful media (audio and video) capabilities and are connected to the internet via cell phone data services or broadband links, such as Wi-Fi that are high bandwidth and can access online media services that have wide and deep content.

The use cases or applications of these various forms of digital media, media services and media sources and playback systems have been evolving. Initially it was enough to connect a media source to a media destination over an IP network. This is widely used today with Internet based media source services, such as Netflix and a computer as a media destination. Users watch Netflix movies streamed over a wired IP network (the internet) to a computer. This is a case of a single point (one IP source) to single point (one IP destination) connection over a wired IP network. Even though the Netflix media service may send the same media to multiple households, each of these is a single point to single point connection TCP/IP connection. A further evolution of this is to use a wireless, Wi-Fi connection, instead of a wired Ethernet connection. This is still a single point to single point connection.

The applications targeted in this invention are for a further extension of the above use cases where the media source connects to multiple destinations rather than a single destination. These are single point (one IP source) to multi point (multiple IP destinations) applications. An example would be where a user is playing a 5.1 movie media file to a wireless video playback device and 6 independent wireless audio destinations making up a full 5.1 surround sound system. In this case the media is going from one media source to 7 media destinations simultaneously. In another example, a user is playing music from one media source to 6 audio playback systems placed around the home in 6 different rooms.

In both of these cases, it is necessary to play (render) the media at all destinations time synchronously. Furthermore, it is necessary to limit the use of resources at the media source, such as keeping memory use to a minimum. In addition, it is necessary with multiple devices receiving media to manage network bandwidth efficiently.

In some applications, the video media may be rendered through one path, for example a specialized hardware path, and the audio may be rendered through a different network path. When different media components of the same media are going through different paths, it is necessary to keep path delays (path latency) to a minimum. This is necessary to keep the different media components time synchronized. In these applications, keeping media network transport latencies to a minimum is important.

Furthermore, when the network is Wi-Fi, network packet losses can be high and it is necessary to mitigate these in order to deliver uninterrupted playback.

The general structure of these application are that of multiple IP networked media source devices choosing, connecting and playing media to one or more IP networked media playback devices over an IP communication network.

FIG. 1 shows an exemplary system 100 having multiple media source devices 104 and multiple media destination devices 106.

Figure 2:
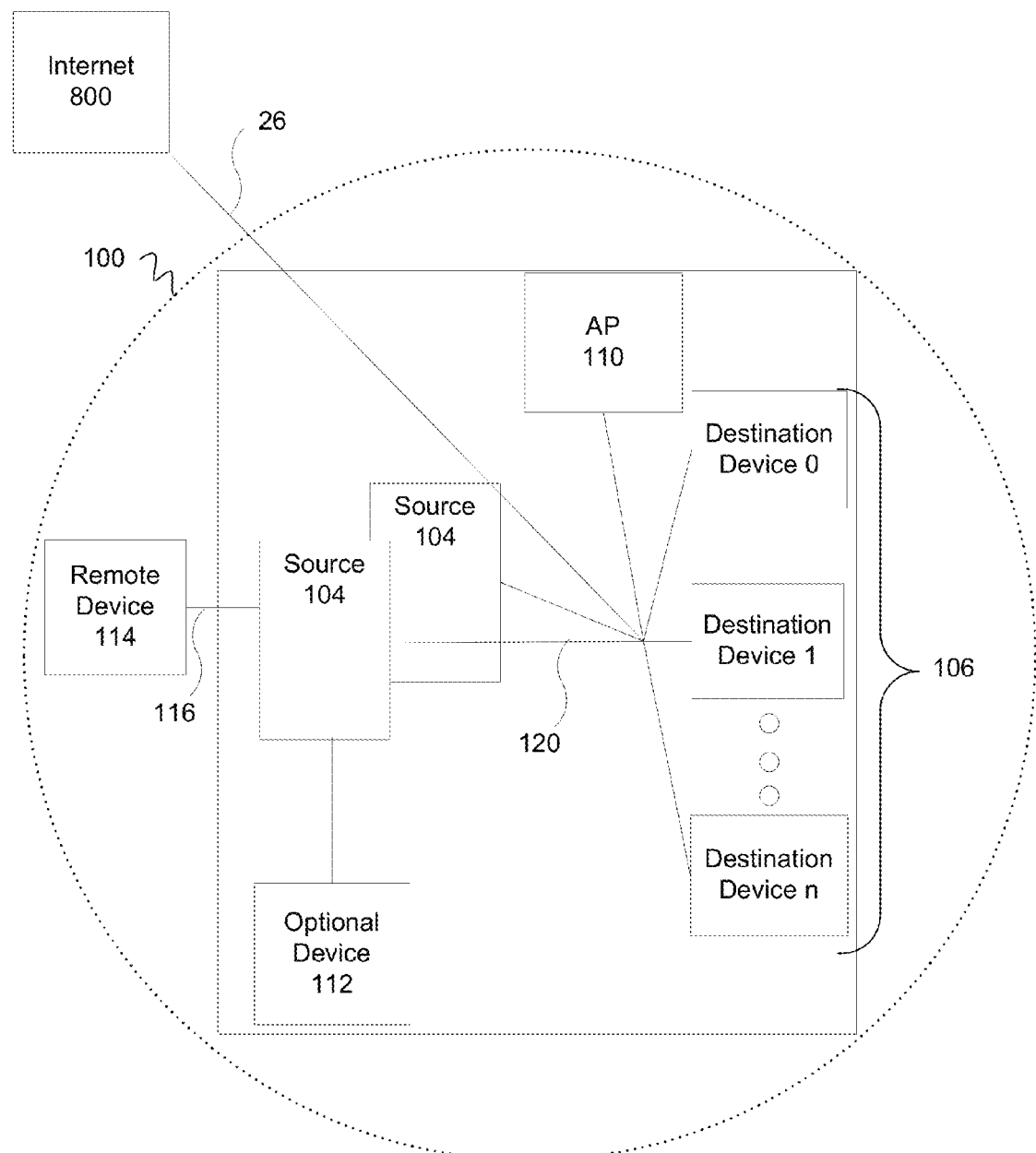
FIG. 2 illustrates a schematic of the devices in a system in accordance with one embodiment.

FIG. 2 is a schematic diagram of such a media system 100 with one or more IP network-enabled media source devices 104 and one or more IP network enabled media destination devices 106 connected via an IP network 120.

Referring to both FIG. 1 and FIG. 2, a media source device 104 can be any variety of computing devices that can originate digital media including computers (e.g. desktop, notebook 14, tablet 12, handheld), mobile devices (e.g. smart phone 10, electronic book reader, organizer devices), as well as set-top boxes and game machines 16. The media is any form of digital media, including audio or video, images, data, and/or Meta data.

Media destination devices 106 are devices that can receive digital media over an IP network 120 and play this media. This includes IP-enabled audio and/or video and/or imaging devices that can render audio or video or images or combinations of these at the same time. Media destination devices 106 include computers (e.g. desktop, notebook 15, tablet 13, handheld), mobile devices (e.g. smartphones, tablets, notebooks 15), network enabled TVs 20, network enabled audio devices 18, 22. If the media is audio, playing the media means rendering the audio such that a user can listen to the audio. If the media is video, playing means rendering the video such that a user can view the media. If the media includes both audio and video, it means rendering both the audio and the video. If the media is images, playing means displaying these images on a screen. In this description, media destination devices 106 may also be referred to as media renderers or combinations of these terms.

In the media environment 100 of the present invention, each media source 104 can send its media to a selected set of media destination devices 106 for playback.

The network 120 and all networks used and described in this invention to connect all devices, including the media sources 104 with the media destinations 106 may be any network that supports an IP protocol. This includes any wired IP connectivity mechanism including Ethernet if wired and if wireless it includes any wireless IP connectivity mechanism including Wi-Fi. If this 120 is a Wi-Fi network, then the network 120 may include a Wi-Fi access point (AP) or Wi-Fi router 110 that manages the network in infrastructure mode. Alternatively, the network 120 may be using Wi-Fi Direct (Wi-Fi Direct is a standard of the Wi-Fi Alliance), in which case the AP 110 may not be present. The IP network 120 may also be connected to the internet 800 through a wide area network connection 26. The source 104 may also have a remote device 114 associated with it such as a remote control device connected via an IP or other communication link 116. In addition the source 104 or network 120 may have additional optional devices 112 such as a NAS (Network Attached Storage) device that provides media.

IP networks can use several different types of messaging including unicast, multicast and broadcast messaging. Messaging being the sending of IP packets.

Unicast messaging is a type of Internet Protocol transmission in which information is sent from only one sender to only one receiver. In other words, Unicast transmission is a one-to-one node transmission between two nodes only. In unicasting each outgoing packet has a unicast destination address, which means it is destined for a particular destination that has that address. All other destinations that may hear that packet ignore the packet, if the packet's destination address is not the same as that destination's address. Broadcast is a type of Internet Protocol transmission in which information is sent from just one computer, but is received by all the computers connected on the network. This would mean that every time a computer or a node transmits a 'Broadcast' packet, all the other computers can receive that information packet. Multicast is a type of Internet Protocol transmission or communication in which there may be more than one sender and the information sent is meant for a set of receivers that have joined a multicast group, the set of receivers possibly being a subset of all the receivers. In multicasting, each multicast packet is addressed to a multicast address. This address is a group address. Any destination can subscribe to the address and therefore can listen and receive packets sent to the multicast address that it subscribed to. The benefit of multicasting is that a single multicast packet sent can be received by multiple destinations. This saves network traffic if the same packet needs to be sent to multiple destinations. When the same data needs to be sent to multiple IP destinations generally, Broadcasting or Multicasting, rather than Unicasting, provides the most efficient use of the network.

In this description the terms Broadcast and Multicast may be used. In both Broadcasting and Multicasting, when messages are sent, they are received by multiple destinations. Therefore in the present specification, the terms Broadcast and Multicast may be used interchangeably to refer to one packet being received by multiple destinations. In some cases this description only says the media is sent or transmitted without specifying whether it is broadcast, multicast or unicast. In this case, it means any one of these methods may be used for sending or transmitting the media.

In this description, the terms Message and Packet are often used and may be used interchangeably. A Packet is a data set to be sent or received on an Internet Protocol network. The Packet may or may not be the same as an 'Internet Protocol Packet'. A Message refers to the logical information contained in such a packet. In this description, the term Segment may also be used to refer to a data set. A data set is a set of bytes of data. Data may be any type of data, including media or control or informational data. In this description the term data and packet may also be used interchangeable depending on context. Packet refers to a data set and data refers to data in general.

Many IP protocols are accessed from software programs via a Socket application programming interface. This Socket interface is defined as part of the POSIX standard. POSIX is an acronym for "Portable Operating System Interface", which is a family of standards specified by the IEEE for maintaining compatibility between operating systems.

Currently when the same media data needs to be sent to multiple network destinations, the general technique for doing so is to use data multicasting to the multiple destinations that need to receive the data.

In such a system the media is multicast to all the destinations and it is up to each destination to attempt to render the media appropriately. If during rendering there is an error where a renderer does not receive new media data or does not receive it correctly, the renderer may render erroneous data and then attempt to recover and continue correct media rendering from the point after the error when correct data is received. For example, during rendering of a H264 stream, if there is an incidental data drop out, the displayed image may pixilate briefly and then recover.

In the applications envisioned here, there is a need to send media from a source to multiple media devices, such as TV and speakers in the same listening and viewing space. Furthermore there is a need to send this media over a wireless network such as Wi-Fi.

For these applications, this means all of the media rendering devices, such as speakers, that are in the same listening or viewing zone, need to be precisely synchronized to each other, so the listener and/or viewer does not discern any unintended media experience.

Secondly, because the media is transported over wireless, there is a very high likely hood of a media error, where the media is not received at each destination reliably or uniformly. If using broadcast or multicasts to send packets, the same broadcast or multi cast packet, may be received at one destination but not received/heard by another destination.

In order to synchronize the rendering of all media destinations, this invention uses a technique as described in U.S. patent application Ser. No. 11/627,957.

In this invention, in order to broadcast media over a Wi-Fi network, it is first necessary to recognize that broadcast or multicast media will not be received at all destinations uniformly. Some destinations will receive a multicast packet, while others will not.

IP networks were first designed to operate over wired networks. By design, the packet communications on these networks were 'best effort'. This means any packet transmitted on the network may not be received by the intended destination. This is most often due to a collision, where another device starts to communicate at the same moment as the device of interest, thereby causing a collision. Another method of loss would be the devices in the network path, such as routers, simply dropping the packet, for example due to the lack of buffer space. Other reasons for loss could be that the wired line is simply noisy and the packet transmission got corrupted, though this is rare for the wired case vs. the wireless case.

In all these wired situations, it is generally the case, that if the transmission, for example a multicast message, was received by one device on a 'subnet' or wire, all the other devices on the same 'wire' or subnet also receive the transmission correctly. This is because in the wired case, the noise or interference situation of a device on one part of the wire is not so different from the noise situation at another part of the wire. If the wired devices are connected via a switch rather than a hub, the same issues are true, the amount of noise or interference is minimal.

In Wi-Fi the differences in receipt of Wi-Fi traffic at each Wi-Fi device in a subnet is substantial. Therefore it is necessary to account for this in the applications described in this invention.

To account for the differences in Wi-Fi traffic receipt at each device, this invention proposes a mechanism, referred to as 'Managed Receipt' where the media broadcaster manages the receipt of media packets at each media receipt device. Note any reference to the word 'broadcast' refers to the English meaning of the word as well as the IP communication methods of both broadcasting and multicasting. Broadcasting may also be implemented by unicasting IP packets to several destinations—which has the same effect as a broadcast, though it is not an efficient use of the network, if the entire payload in each packet is the same.

Traditional Protocols

In traditional point to point transmission protocols such as TCP, the internet standard Transmission Control Protocol as defined in Internet Protocol Request for Comment 793 (RFC 793), there is a need to have guaranteed packet transmission from end to end. TCP does so, by storing the packets to be sent in a buffer at the source, sending the packets to the destination and then discarding the packets at the source only when the destination end acknowledges receipt of the packet. If the destination does not acknowledge a packet, it is retransmitted.

Figure 3:
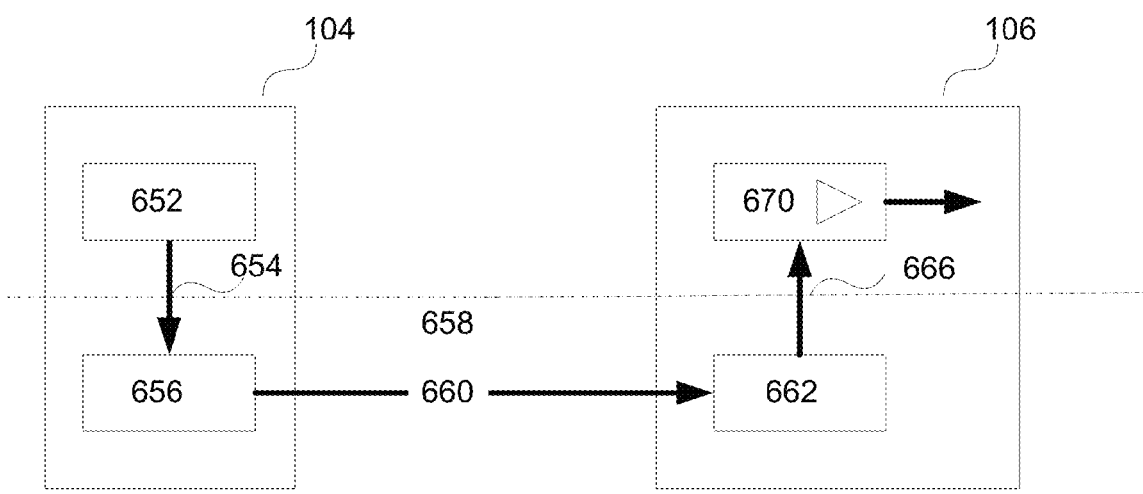
FIG. 3 illustrates a typical TCP/IP connection from a media source to a media rendering device.

FIG. 3 shows a typical TCP connection between a data source 104 and a data destination 106. The source 104 has an application 652 that uses TCP 658 for transporting media from the source 104 to the destination 106. The destination 106 has an application 670 that receives data from the TCP 658 layer. The TCP 658 layer consists of a TCP source 656, a TCP over IP network link 660 and a TCP destination 662. The source application 652 sends data via the TCP layer 658 by using a socket interface 654. The destination application 670 receives data via a socket interface 666.

Figure 4:
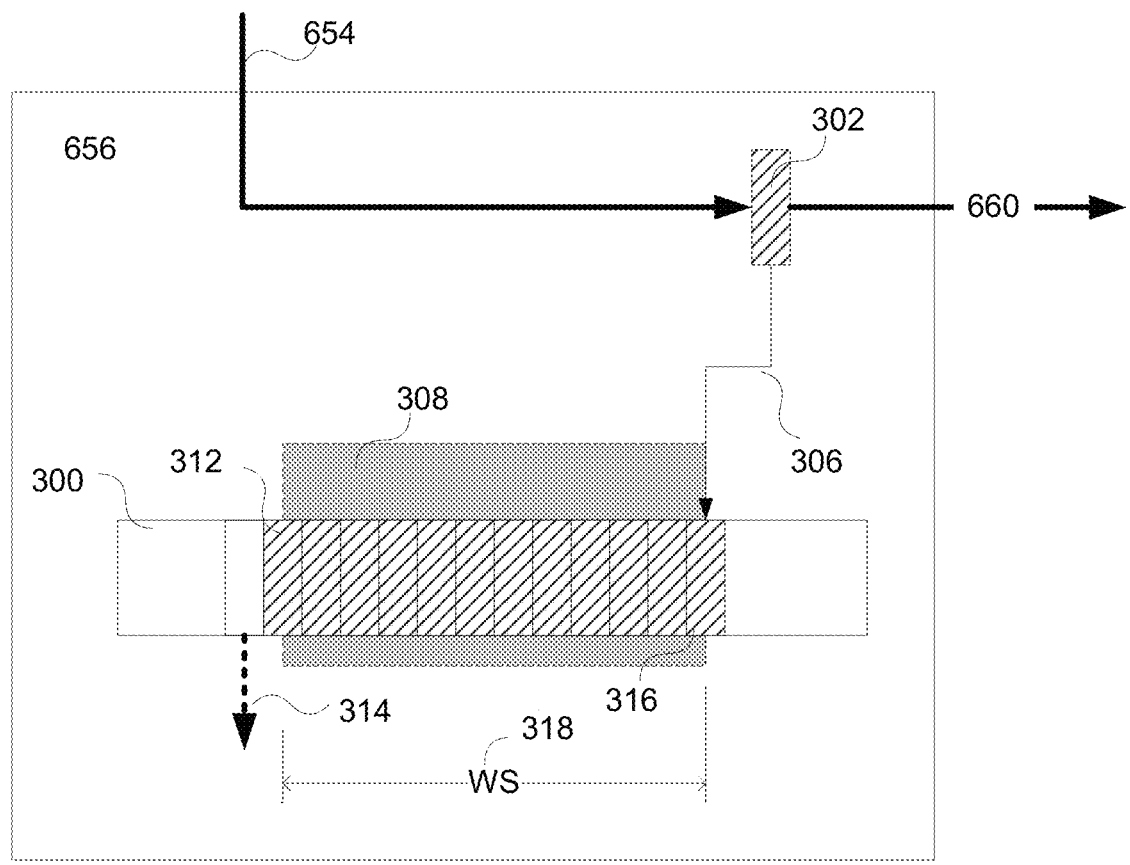
FIG. 4 illustrates the TCP/IP sliding window protocol.

TCP manages the flow of data by providing receipt information at the TCP destination 662 to the TCP source 656 and the TCP source 656 using this information and a flow control algorithm to control the flow of data. FIG. 4 shows a detailed view of the TCP source 656, which contains a retransmission queue 300 and a sliding window 308 that maintains current transmission status information.

FIG. 4 shows the sliding window 308 algorithm used by TCP to control the flow of data from the TCP source 656 to the TCP destination 662 (See FIG. 3). When a data set is sent from the source 656 (see FIG. 3) to the destination 662 (see FIG. 3), the data is grouped into segments and each segment is marked with a sequence number that represents the byte number of the first byte of the segment. During sending 654, an outgoing segment 302 is sent 660 from the source 656 to the destination 662 and then put 306 in a retransmission queue 300 at the TCP source 656. As data is sent from the TCP source 656 to the TCP destination 662 and received by the destination 662, the destination 662 sends acknowledge messages back to the source 656 indicating the highest sequence number the destination 662 has received. Any segments in the retransmission queue 300 that have a sequence number that is equal to or less than the highest sequence number the destination 662 has received is discarded 314 by the source 656 from the retransmission queue 300. The sliding window 308 in the retransmission queue 300 therefore contains segments 312-316 that have been sent to the destination, but have not been acknowledged. When data is acknowledged by the destination, the destination includes a sliding window 308 size 318 to use by the source. This sliding window 308 size 318 is used by the source 656 to limit the number of segments the source 656 can send that have not been acknowledged.

For the earliest segment 312 that has not been acknowledged, the source 656 keeps track of a timeout value. If this value is greater than the Retransmission Time Out (RTO), then the source 656 restarts transmitting segments from this segment 312. The RTO value is computed based on a calculation using the round trip time. The RTO is dynamically computed and can change over time.

Some key points to note about the TCP protocol are that:

When TCP is sending data, it is sending to a single destination.

In TCP, any segment that is received over the network with a sequence number that is out of order and greater than the next sequence number the destination 662 is expecting is discarded by the destination 662. This discarding of data received over the network, just because it was sent out of order, is very wasteful of network resources.

In this invention, as described below, out of order packets are saved in the receive queue for use later.

In TCP, after a segment times out, the TCP protocol restarts sending from the beginning of the retransmit window. This means any segments that have been received by the destination and have now been discarded are resent. This is again wasteful of network resources. In this invention retransmission of packets that have already been received is avoided.

In TCP the destination only indicates the highest consecutive sequence number it has received. In this invention both the highest consecutive sequence number and any missing packets are reported by the destination.

TCP philosophy is a slow start. This invention is tailored for a fast start and slows down fast when network conditions are bad.

TCP assumes that packet losses are occurring due to congestion and therefore slows the throughput by reducing the amount of data in transit (reducing windows size 318) and waiting longer for acknowledges. However, in wireless networks, packet loss may occur unrelated to congestion. So when TCP is used over wireless and it decreases the rate, due to packet losses rather than congestion, this rate decrease is inappropriate and is an undesired effect.

Figure 5:
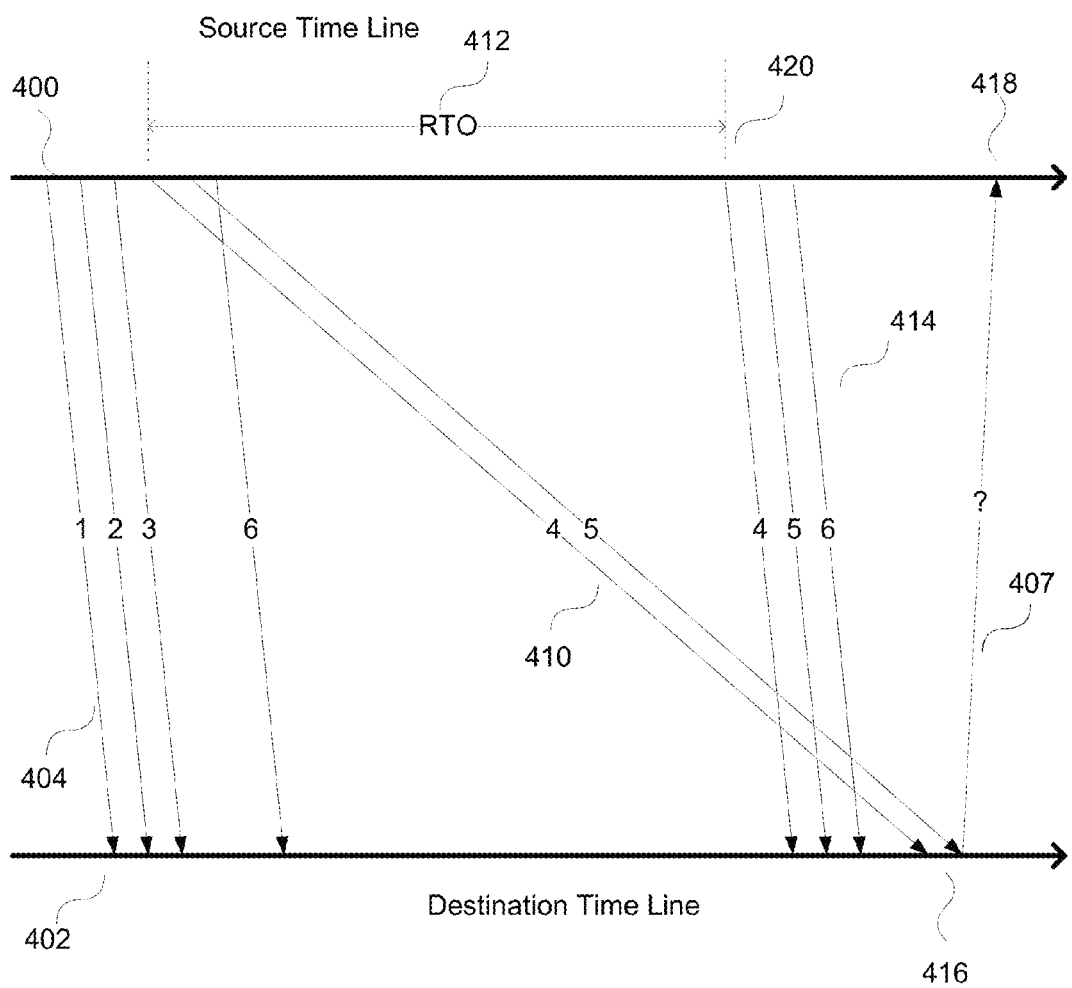
FIG. 5 illustrates typical TCP/IP packet communication between source and destination.

FIG. 5 shows a timeline of packet (data set/segment) transmission and receipt at the source 400 and destination 402 using TCP. This shows an initial set of packets 1 through 6 being sent from the source 400. Of this, an initial set of packets 404 marked 1, 2 and 3 are received at the destination 402. The next set of packets 410, packets marked 4 and 5, are not received at the destination 402 until time 416 and therefore the acknowledge message for these packets 407 is not received by the source 400 till time 418, which is well past the timeout period RTO 412. Therefore the source 400, when the timeout period RTO 412 expires, will retransmit packets 414 starting at the timed out packet marked 4 at time 420. Depending on what the timeout period RTO 412 is set at and what the delay in arrival of the initial set of packets marked 4 and 5 410, the second set of packets 414 may arrive before time 416 or after time 416.

A key point regarding this algorithm is that the decision to retransmit packets is made by the source 400 based on a timeout period RTO 412 and the lack of an acknowledge message from the destination. Therefore the source 400 makes decisions based on limited information about receipt conditions at the destination 402. Secondly, because TCP assumes those acknowledge delays or acknowledge absence is largely due to congestion rather than interference, it errs on the side of a long RTO and smaller window size and increases and decreases these respectively when timeouts occur. When packets are merely lost due to interference, such as in the case with Wi-Fi networks, rather than due to network congestion, this causes an inadvertent drop in transfer rate that is undesirable and unnecessary. Thirdly, because it restarts sending all packets in the retransmission queue, a significant amount of unnecessary repeat traffic can occur, wasting network bandwidth.

During heavy packet transmission, the network stack and all devices in the network path, such as routers and access points may have many packets to transmit and receive from many sources. Since the order in which packets are processed at the IP layer does not have to be in the same order as it is received for service, they may be handled in any order. Therefore as shown in FIG. 5, packets marked 4 and 5 sent in set 410 may arrive much later than a retransmission of these packets sent in set 414. For example, packets 4 and 5 in set 410 may have been sent to an 802.11 access point from a source network adapter (uplink). The access point may then process other packets from other network adapters and may even lose RF connectivity with adapters. The access point may then reconnect and receive a new set 414 of packets 4 and 5 from the source network adapter and send them to the destination adapter (downlink), before finishing the downlink of packets 4 and 5 it received in set 410, and that was waiting in a queue for processing, by sending them to the destination network adapter.

Figure 6A:
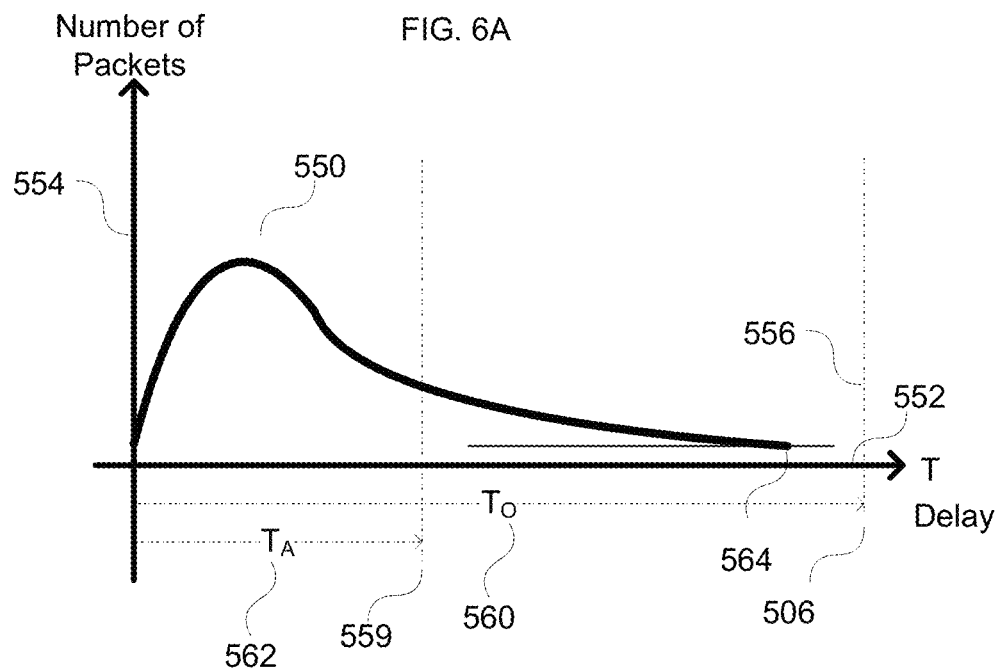
FIG. 6A illustrates the number of packets received at each packet to packet delay.

FIG. 6A shows a plot of the number of packets received at various packet to packet receive delays measured over a period of time. The packet to packet receive delay is the time interval between the receipt of a packet and the receipt of the next packet. The Y axis 554 shows the number of packets received and the X axis 552 shows the delays. The plot 550 shows that the packet to packet delays rise to a peak and then fall until they reach a point 564 where the delay goes to infinity, i.e. the packet is lost and will never arrive.

If a transmission algorithm waits for a timeout period $T_O$ 560 for packets to arrive before requesting retransmission of these packets and if $T_O$ is set to be longer than the largest delay 564 seen, then the system will only retransmit packets that are truly lost. If the timeout period is set to a shorter interval such as $T_a$ 562, then on many occasions the system will retransmit packets that are still on its way and may arrive later, after the timeout period $T_a$ has expired.

Figure 6B:
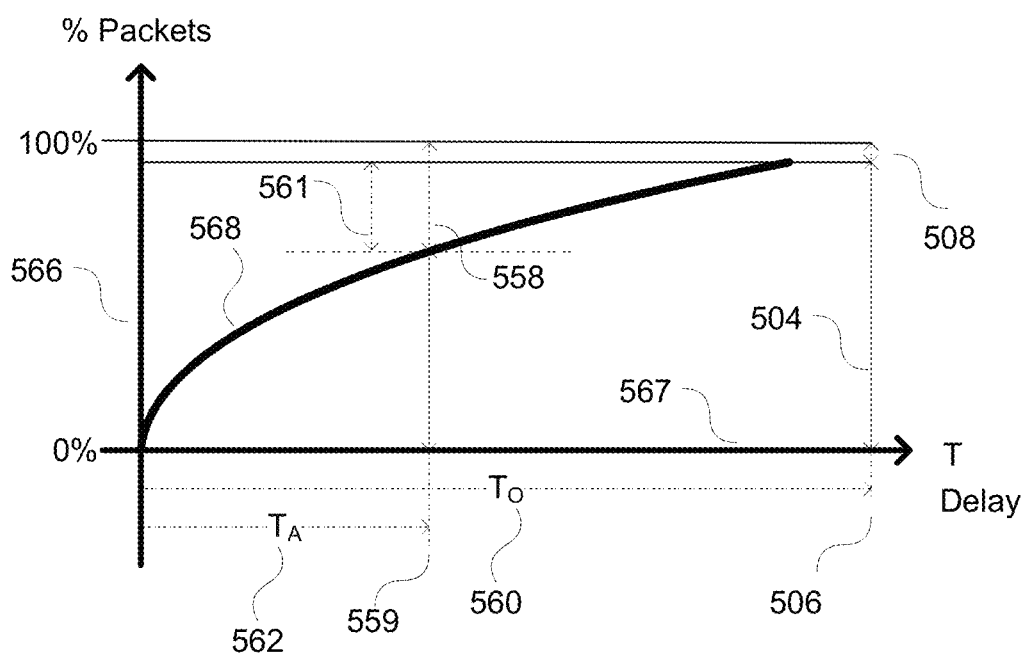
FIG. 6B illustrates the percent of total packets received for each packet to packet delay.

FIG. 6B shows the effect of this in more detail. This is a plot 568 of the total number of packets to arrive under a delay of T, as a percent of the total number of packets sent over the measurement period. In this plot, the Y axis 566 is the total packets received over the total packets sent as a percent and the X axis 567 is various possible timeout periods. If the timeout period is $T_O$ 560 and the corresponding delay is 506, then the percent of packet retransmissions 508 will only be for lost packets. All other transmissions 504 will be for received packets. If the timeout period is set to $T_a$ 562 a shorter interval, and the corresponding delay is 559, then the percent of packet retransmissions 558 will not only include lost packets 508, but also a significant amount of packets 561 that are already on the way, but are just slow. This means that as the timeout period is shortened, the amount of excess repeats of packets already in transit increases. This retransmission of packets that have already been transmitted and will arrive in due course is wasteful of network resources. However, a short timeout period will ensure that packets that would otherwise be slow to arrive are received more promptly, by requesting their retransmission. Therefore the choice of the timeout period T is a tradeoff between requesting retransmission of delayed packets to ensure prompt packet receipt and wasting network resources in excessive retransmissions of the same packets.

When it comes to point to multi point transmission, current protocols such as RTP, the Real Time Transport Protocol, simply multicast all packets to all the destinations. There is no mechanism to guarantee packet transmission and receipt to all destinations. Each destination gets what it gets. RTP therefore is effective in getting the same packet to multiple destinations, but is not helpful in ensuring all packets get to each destination.

Loss Anticipation and Preemption Algorithm

In many applications, as in FIG. 1, there is a need to get media from the media source 104 to the media destination 106 as promptly as possible, i.e. with minimum delay or latency. In addition, there is a need to get all the data to the destination with no data losses. These two requirements are conflicting requirements. If the underlying transport can lose packets, then in order to recover from data loses, it is necessary to retransmit these packets. Doing retransmission however takes time and so increases overall latency. Note it is possible to do forward error correction in some cases, but when whole packets can be lost, it is more effective to retransmit the lost packet.

For example, the destination 106 may be rendering media sent from the media source 104 at a certain time offset from the time it was sent from the media source 104. If the media takes longer than this time offset to get to the destination 106, then the destination 106 will run out of media data to render and will underflow. Similarly, if the data sent to the destination 106 get lost along the way, then the destination will have no media to render, when it comes time to render the media that was lost and rendering will be erroneous. Therefore it is necessary to ensure that all media is received at the destination and if any retransmission needs to take place that it takes place and lost data is received before the destination rendering underflows.

The time lost in retransmission includes the time it takes for a packet to be identified as lost at the destination, a loss notification being sent to the source, the source resending the packet and the retransmitted packet being received by the destination. This total time adds to the total system 'latency'. If it takes 100 mSecs for this process to occur, data receipt at the destination will be delayed by 100 msecs.

In order to keep this latency low, it is necessary to keep these delays as low as possible. In general the actual physical transmission times are low, in that they are not much more than the packet transmission times, measured in 1-2 mSecs.

A major delay in the retransmission process is how long it takes to detect that a packet is lost.

This invention describes a process/algorithm known as a Loss Anticipation and Preemption algorithm (LAP) for keeping this loss detection delay low. This LAP algorithm is implemented in a transport protocol named FCP (FireCast Control Protocol).

This LAP algorithm is designed to make early pre emptive decisions about potential packet loss and have these packets retransmitted. This, as mentioned above, is a tradeoff of using additional network resources to ensure the more timely availability of packet data.

In addition, unlike in TCP where the TCP source makes the decision to retransmit data, in LAP it is the destination that makes the decision to request a retransmission of data. The destination has more accurate and up to date information regarding the status of data received and is therefore in a better position to make timely requests for retransmission.

Figure 7:
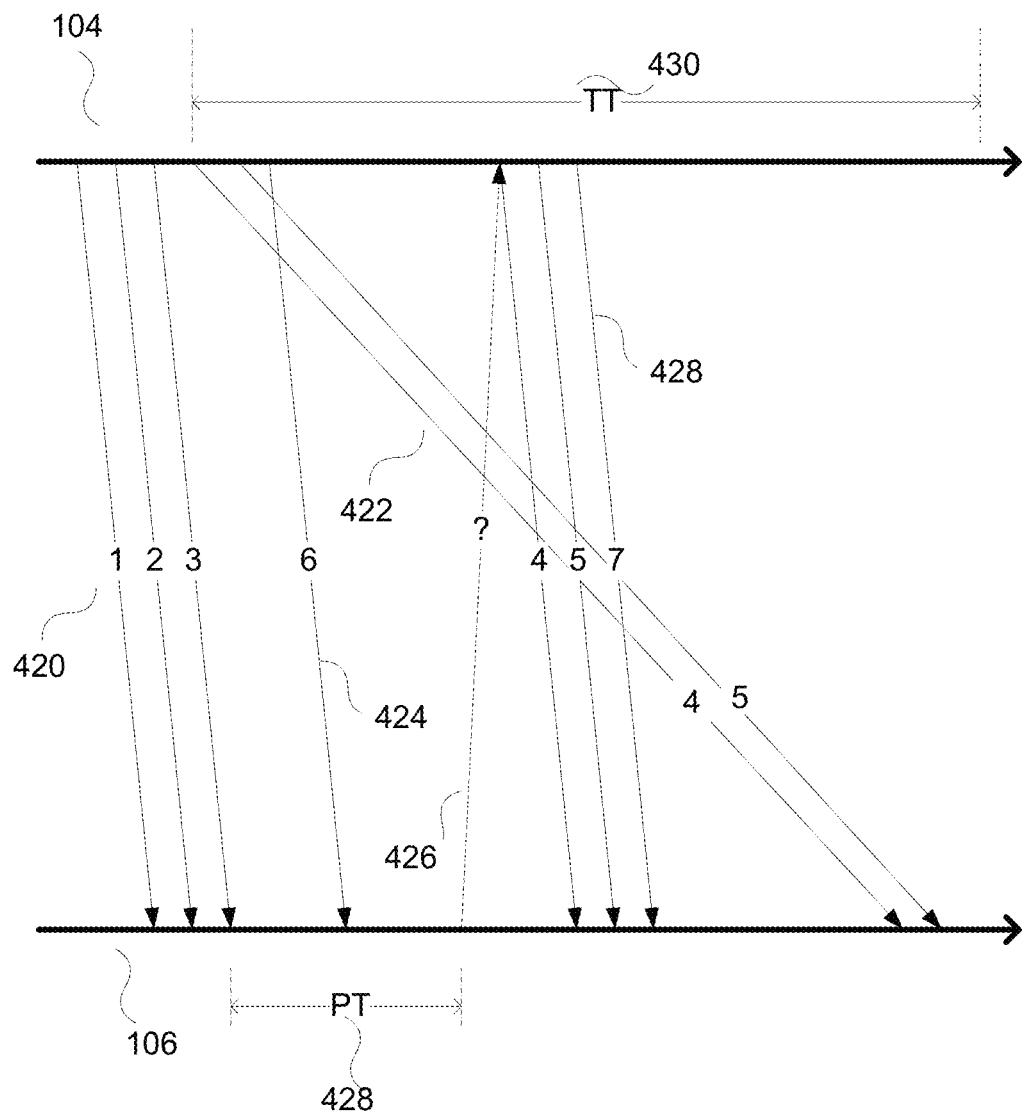
FIG. 7 illustrates packet communication between source and destination with a pre emptive retransmission request.

FIG. 7 shows what can happen in a typical Wi-Fi network. In general a Wi-Fi network will transmit the packets from Source 104 to destination 106 in the order that they were given to the source for transmission. However, in transmission, these packets may be lost, the order of packet transmissions mixed up and each packet may be delayed by an unknown amount of time. The occurrence of these is determined not only be RF/Wi-Fi factors as described above, but also due to implementation issues, such as buffer sizes in the access point and network traffic congestion at that particular moment. In FIG. 7 a set of packets 1 through 6 are sent from the source 104. Of these, packets 1 through 3 are received 420 after a transit time at the destination 106. Packets 4 through 5 are delayed and arrive 422 at the destination 106 with a significant delay. Packet 6 however is not delayed and arrives 424 at the destination after a transit time.

In a traditional TCP type sliding window algorithm, the source 104 would wait a timeout period TT 430 for an acknowledge for the packets it sent and then would retransmit packets 4 through 7

However, if the destination 106 were to detect on receipt of packet 6 that packets 4 and 5 were missing and if it were to use this information and a short timeout period to request retransmission of these packets from the source 104, it is possible to get these packets to the destination 106 before the delayed packets 422 finally arrive. This is what the LAP algorithm in this invention does. In this invention, a metric is computed for the chance of a packet that has not been received as being lost. This metric is based on multiple factors; the order of receipt; delay in receipt and need for data expressed by an application using the media data. This metric is then used to request 426 retransmission of packets, as shown in FIG. 7, and receive these packets 428 before the delayed packets 422 arrive.

Figure 8:
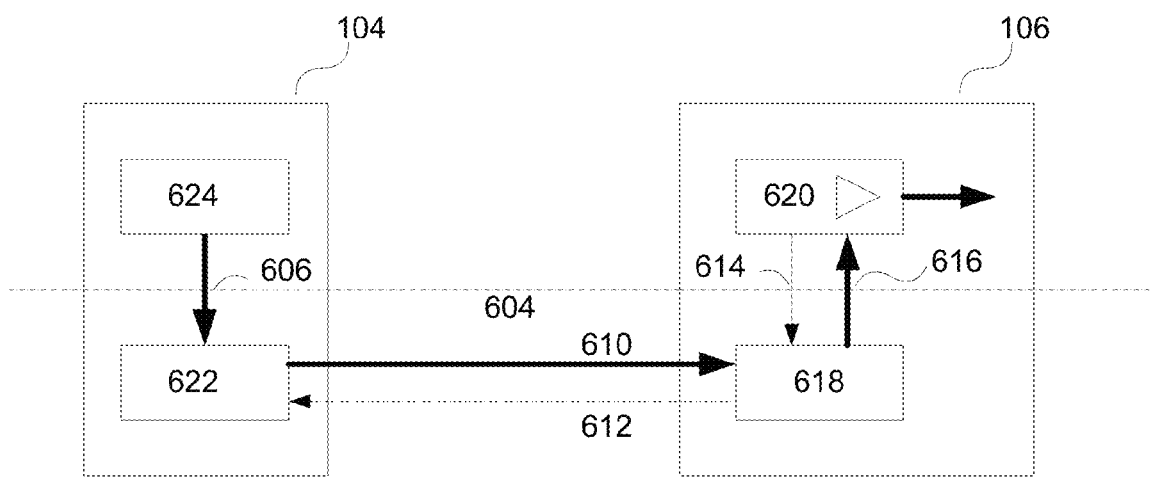
FIG. 8 illustrates the transmission elements used in the LAP methods of this invention.

FIG. 8 shows the overall architecture used. The system consists of a media data source 104 and a media destination 106. The media source has a media application 624 that sends media to a media destination application 620 that is in the media destination 106. In this application, as mentioned above, it is desirable to get the media from the source application 624 to the destination application 620 both with as low latency as possible and with no data loss.

As in the TCP case, the media application provides the media to be transported to a transport layer 604, named the FCP (FireCast Protocol) layer, via a transport layer interface 606. The FCP transport protocol consists of a FCP source 622 and a FCP destination 618 and an IP network link connecting them. This network link sends data packets 610 to the FCP destination 618 and status messages back 612 from the destination 618 to the FCP source 622. The status messages 612 include informational messages and request to retransmit packets. The destination application 620 receives the media data via an application interface 616 to the FCP transport layer 604.

Unlike in the TCP case, in FCP the destination application 620 that is the consumer of the data provided by the FCP transport, in addition to receiving data through the application interface 616 also indicates to the FCP transport layer its current level of urgency or need for data to the Transport Layer 604.

In addition, unlike in TCP, the FCP destination 618 is not a passive provider of information to the source. In FCP, the FCP destination 618 makes decisions regarding the data packets it has received and makes data packet retransmission requests 612 to the FCP source 622. The FCP source 622 services these requests. Data packet timeout decisions are made at the destination 618.

Figure 9:
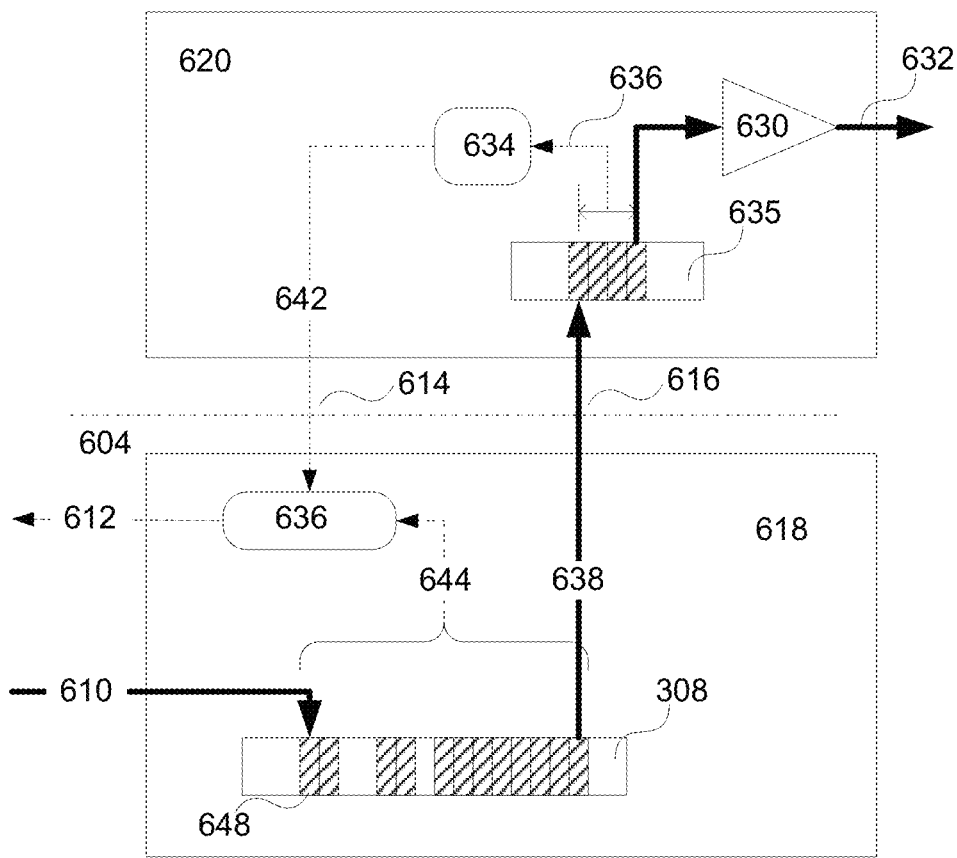
FIG. 9 illustrates the destination components used to make pre emptive retransmission request.

FIG. 9 shows this system in more detail. The destination application 620 is the consumer of media data packets 616 coming from the media source 624 (in FIG. 8) via the transport layer 604. The media rendering media destination application 620 has a buffer 635 to store the media data it has received via the transport interface 616 and has a media rendering component 630 that takes media data from the buffer and renders it 632.

The destination applications 620 using FCP also provides information indicating its current Need level 642 to the FCP transport interface 614. This Need level indicates the destination/media data consumer applications need for data to the transport level 604 and is computed in a variety of ways. In this embodiment as the amount of media data available in the buffer 635 gets low, the Need for media data gets high. This Need value is computed by logic 634 that is monitoring the level 636 of valid media data in the buffer 635.

The FCP destination 618 includes a received packet collection (RPC) 320 and LAP algorithm process 636 to provide receipt status and packet retransmission requests 612 to the FCP source 622 (see FIG. 8). The LAP algorithm 636 periodically scans 644 the RPC 320 together with the need level 614 to make the retransmission requests 612.

Each packet that is transmitted across the network is given a unique identifier by the source 622 (see FIG. 8), a PID (Packet Identifier). Packets are therefore identified by their PID and may be referred to as a PID in the description below. Since the destination 618 may receive these packets out of order, it has a reordering mechanism built into it. In this mechanism, the packets 648 are put INTO the received packet collection (RPC) 320 on receipt, in any order, as they are received. The packets are taken OUT 638 of the RPC 320, based on PID order. I.e. packets are removed in incrementing PID order. If the next PID is not present in the RPC 320, the destination's 618 packet removal process halts, waiting for this PID.

The goal of the LAP algorithm is to ensure that the next PID required is already always present in the RPC 320 at the destination, when the destination application 620 wants to use/consume it by moving it to its buffer 635.

Figure 10:
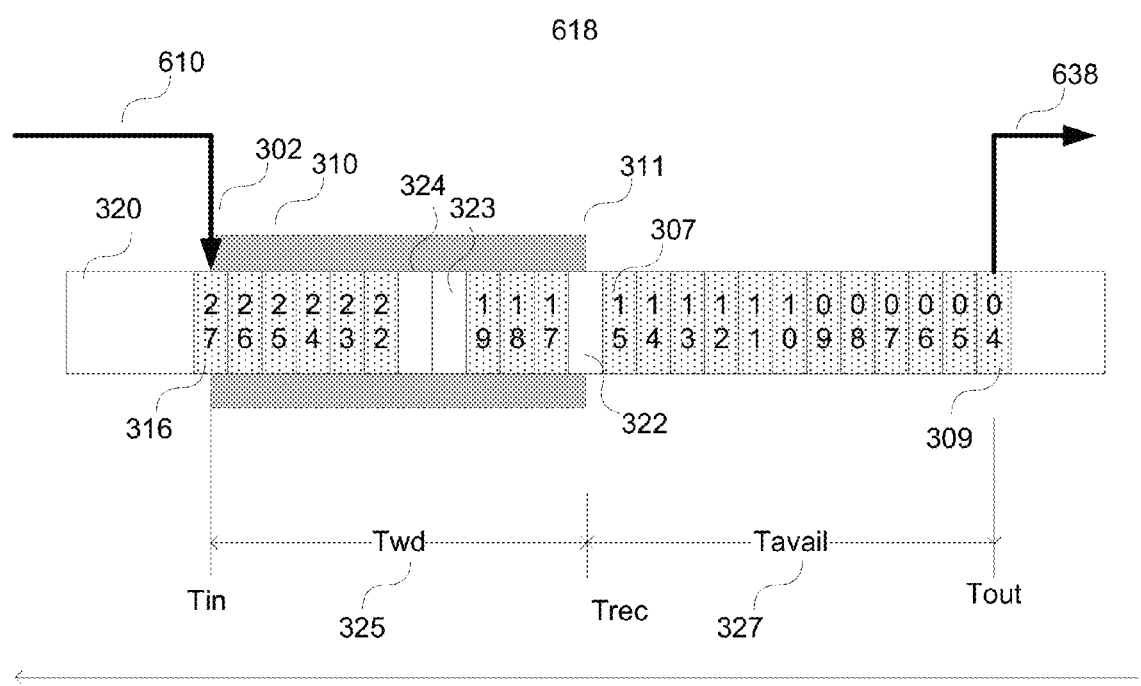
FIG. 10 illustrates a detailed example of the received packet collection used at the destination.

Since the packets in the RPC are received in any order, the contents of the RPC 320, see FIG. 10, can be viewed as a linear list of Packets with 'gaps' 322, 323, 324 in the list for packets that have not yet been received. These packets 322, 323, 324 that have not been received yet are identified by their PIDs, and are referred to as missing PIDs 322, 323, 324.

FIG. 10 shows details of the FCP destination 618 shown in FIG. 8 and FIG. 9. Some of the references in this description refer back to FIG. 8 and FIG. 9. In FIG. 10 the latest packet received 610 from the FCP source 622 (see FIG. 8) is 316 with PID 27. The oldest and next packet that the destination application (see FIG. 8) 620 may consume via link 638 is 309 PID 04. It shows PID 16, 322, PID 20 323 and PID 21 324 as missing. Associated with the RPC 320 is a media In-Transit window 310 that identifies the part of the RPC 320 that has missing PIDs in it. The In-Transit windows starts 311 from the oldest missing PID location 322, PID 16 in this diagram, and ends 302 at the most recent PID, 316, PID 27. When the oldest missing PID 322, PID 16 is received, the start 311 of the In-Transit window will move to PID 20, 323 in this diagram, if PID 18 is received before PID 20. The width of the In-Transit window 310, which starts at the oldest missing PID 322 and ends at the most recent PID 316, is Twd 325. The amount of PIDs available Tavail 327 in the RPC 320 includes the oldest packet received 309 to the packet 307 just before the oldest missing packet 322. These PIDs are available to be used by the consumer application 620.

The LAP algorithm periodically scans the RPC 320 and identifies PIDS in these 'gaps' as missing PIDs 322, 323, 324. A missing PID is a packet that has not been received, but has another packet received after it with a higher PID, than the missing PID.

For each such missing PID, the LAP also computes a metric based on how late the missing PID is with respect to the previous packet received.

Based on this metric, the LAP then sends a list of missing packet PIDs to the FCP source 622 (see FIG. 8). The net effect of this is that the destination 618 asks the FCP source 622 (see FIG. 8) to retransmit packets that are likely lost in the system, before the destination 106 (see FIG. 8) actually needs the packets.

The cost of this method is that the receiver may identify packets as missing that are actually still in transit and may be subsequently received. This amounts to some degree of duplicate transmissions. The LAP adjusts its missing PID identification scans and late packet metric to meet a balance between duplicate transmissions and minimal delays waiting for missing packets to be retransmitted.

In this embodiment the missing PID identification scans are performed periodically at a 20 msec rate. A longer period may be used to reduce processor load for applications that do not require short latency. For very short latencies this scan period can be set as low as 5 msec to check for missing packets very frequently.

In some cases the missing packet is the last packet in a sequence and has no following packet. In these cases, the LAP will trip a basic delay timeout and identify the packet as a late last packet based on this.

Figure 11:
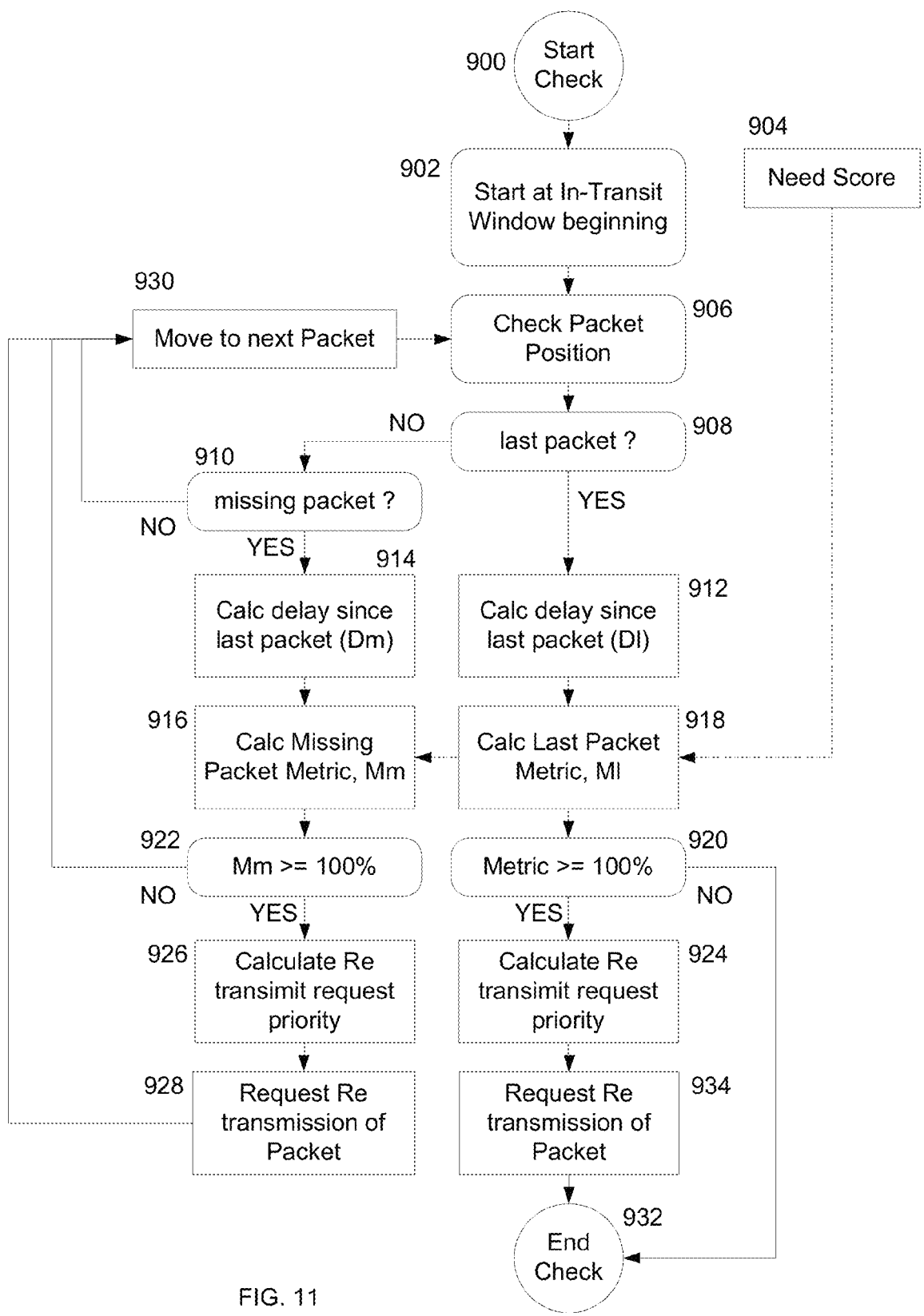
FIG. 11 illustrates the LAP algorithm used at the destination.

FIG. 11 shows the LAP algorithm used by the destination to request packet retransmissions in detail. The LAP process starts 900 by 902 setting the working pointer to the packet at the start 311 (see FIG. 10 for some of the following references) of the In-Transit Window 310 and then checks this packet position 906. If in checking for being the last packet 908 this is not the end of the In-Transit Window 302 and in checking for a missing packet in step 910 a packet is not present at this position 910, this is a missing packet and it moves to calculate a $D_m$ value in step 914. The $D_m$ value is calculated using the delay since the previous most recent packet that was present and a current Need level 904 provided by the destination application 620 (see FIG. 8 for some of the following references) consuming these media data packets. See calculations below for computing $D_m$ and the following values. With $D_m$ a missing packet metric $M_m$ is computed 916 and this metric is compared to a threshold 922. If above the threshold 922, a retransmit priority $R_m$ is calculated 926 and this missing PID is added 928 to a list of Late/Missing PIDs that will be requested for retransmission by the destination 618. If $M_m$ in step 922 is below the threshold, the working pointer is moved to the next packet 930 and this packet position is checked 906. If in step 910 the packet is present, no action is taken and the working pointer is moved to the next packet 930 and this packet position is checked 906.

If in checking if this is a last packet 908 the working packet position is at the end of the In-transit Window 302, then this is the last packet position 908. A $D_l$ value is calculated 912 for this last packet using the delay since the previous most recent packet that was received and a current Need level 904 provided by the destination application 620 consuming these media data packets. See calculations below for computing $D_l$. Then a last packet late metric $M_l$ is computed 918 and this metric is compared to a threshold 920. If above the threshold 920, a retransmit priority $R_l$ is calculated 924 and this late PID is added 934 to a list of Late/Missing PIDs that will be requested for retransmission by the destination 618. In either case, since the working pointer is at the end of In-Transit window the LAP process ends 932.

Below are the calculations performed in the LAP processes described above.

DEFINITIONS $T_{lp}$: Time previous packet was received
$T_c$: Current time
$d_m$: Delay of Missing packet=$T_c - T_{lp}$
$D_{thm}$: Delay Threshold of Missing Packet
$D_{minm}$: Delay Minimum for Missing Packet
$D_m$: Delay as a percent of thresh hold
$M_m$: Metric for Missing Packet as a percent
N: Need as a percent
$K_m$: 1/16
$d_l$: Delay of Last packet=$T_c - T_{lp}$
$K_l$: 1/16
$D_{thl}$: Delay Threshold of Last Packet
$D_{minl}$: Delay Minimum for Last Packet
$D_l$: Delay as a percent of thresh hold
$M_l$: Metric for Last packet as a percent
MIN(A, B): returns the minimum of A or B
$R_m$: Missing Packet retransmit priority
$R_l$: Last Packet retransmit priority
$D_x$: $D_m$ or $D_l$
$M_x$: $M_m$ or $M_l$
$R_x$: $R_m$ or $R_l$ Missing Packet Metric Calculations $$D_m = (d_m - D_{minm})/D_{thm}$$

$$M_m = F_n(N) * F_m(D_m) * K_m$$

$$F_n(N) = 2^{(N/8)}$$

$$F_m(D_m) = 2^{(D_m/8)}$$

$$M_m = \text{MIN}(((1/16) * 2^{((N/8)+(D_m/8))}), 100)$$

$$R_m = N$$

Last Packet Metric Calculations $$D_l = (d_l - D_{minl})/D_{thm}$$

$$M_l = F_n(N) * F_l(D_l) * K_l$$

$$F_l(D_l) = 2^{(D_l/8)}$$

$$M_l = \text{MIN}(((1/16) * 2^{((N/8)+(D_l/8))}), 100)$$

$$R_l = N$$

Figure 13:
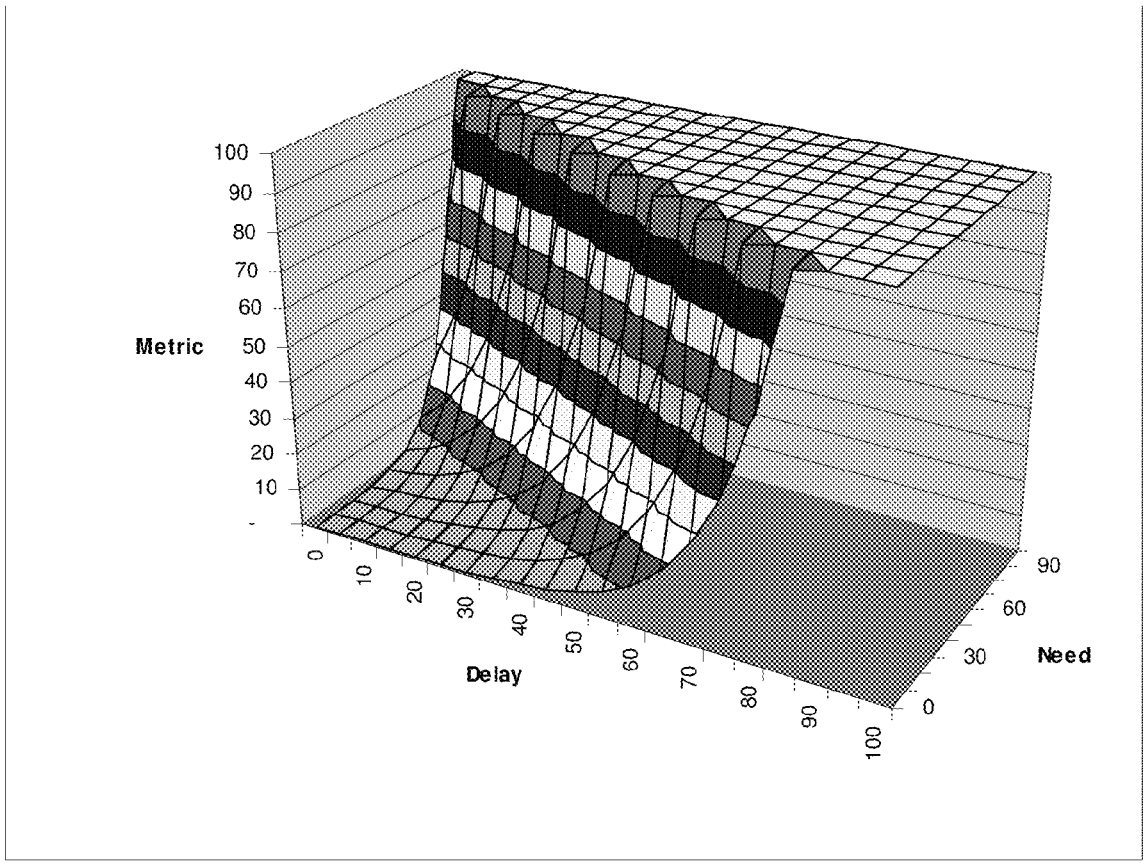
FIG. 13 shows a plot of the calculations shown in FIG. 12.

FIG. 12 shows these calculations computing $M_x$ ($M_m$ or $M_l$) for various Needs, N, vs various Delays $D_x$ ($D_m$ or $D_l$) for thresholds $D_{thm}$ or $D_{thl}$ set to 100 and $K_x = 1/16$. FIG. 13 shows a plot of these numbers. As can be seen as the Delay gets closer to 100% or the Need gets closer to 100%, the Metric reaches 100%. When the FCP destination 618 send a list of Late/Missing PIDs to the FCP source 622, it includes for each Late/Missing PID the metric $M_m$ or $M_l$ and the retransmission priority $R_m$ or $R_l$ for that packet. The source can use this information to adjust how it processes and sends packets to each destination.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems.

The applications this invention are directed at that may be described above and any objects of this invention that are described above do not fully describe all the applications and objects of this invention and these descriptions are not intended to be limiting in anyway or manner Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for low latency transport of media data over an IP network from a media source to a plurality of media destination devices, comprising:
    an internet protocol communication network;
    a media source device comprising a media transport source component and adapted to communicate with the communication network; and
    a plurality of media destination devices each comprising a media transport destination component and a media consuming component and adapted to communicate with the communication network;
    wherein the media transport source component sends media data in packets to a first media destination device using the communication network;
    wherein the first media destination device receives the packets, places them in a collection, and uses the packets in the collection to provide media data to the media consuming component;
    wherein the first media destination device detects a missing packet in the collection, computes a time delay for the missing packet, and uses the time delay to determine whether to ask the media source device to retransmit the missing packet; and
    further wherein the first media destination device sends a requests for the retransmission of the missing packet to the media source device.

2. The system of claim 1 where the media source device identifies each said packet sent with a sequentially incrementing packet identifier; and
    wherein the first media destination device detects missing packets by identifying a first packet having a highest packet identifier that has been received, detects a second packet that has not been received by identifying a packet identifier that is lower than the noted highest packet identifier for which no corresponding packet has been received; and classifies the second packet as a missing packet.

3. The system of claim 1, wherein the determination to request a retransmission comprises the steps of computing a retransmission metric for the missing packet, comparing the retransmission metric to a threshold, and determining that a packet should be retransmitted if the retransmission metric is above the threshold.

4. The system of claim 1, wherein the time delay for the missing packet is computed by subtracting, from a current time, the time that the latest packet, that has been received that possesses a packet identifier that is lower than the missing packet's packet identifier.

5. The system of claim 3, wherein the media consuming component of the first media destination device provides a media data need value to the media destination device; and
    wherein the first media destination device uses the media data need value in computing the retransmission metric for the missing packet.

6. The system of claim 1, wherein the network is a home wireless network.

7. The system of claim 1, wherein the media source device is a smart phone.

8. The system of claim 1, wherein the media source device is an Internet service.

9. The system of claim 8, wherein the Internet service is controlled by a mobile device of a user.

10. The system of claim 1, wherein a plurality of media destination devices each receives a single media channel of a multichannel media object.

11. The system of claim 10, wherein a first media channel is a video channel and a plurality of second media channels of the multichannel media object are a plurality of separate audio channels.

12. The system of claim 11, wherein the plurality of separate audio channels collectively constitute a stereo or surround sound audio system.

\* \* \* \* \*